US007947749B2

(12) United States Patent
Hasegawa et al.

(10) Patent No.: US 7,947,749 B2
(45) Date of Patent: *May 24, 2011

(54) SYSTEM FOR RECYCLING A USED PLASTIC, METHOD FOR REPROCESSING A USED ABS RESIN, AND RECLAIMED ABS RESIN

(75) Inventors: Daisuke Hasegawa, Miyagi (JP); Yasuhito Inagaki, Kanagawa (JP); Haruo Watanabe, Kanagawa (JP); Masahiro Sawaguchi, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/265,045

(22) Filed: Nov. 5, 2008

(65) Prior Publication Data

US 2009/0069453 A1    Mar. 12, 2009

Related U.S. Application Data

(63) Continuation of application No. 10/504,394, filed as application No. PCT/JP03/01432 on Feb. 12, 2003, now Pat. No. 7,462,648.

(30) Foreign Application Priority Data

Feb. 12, 2002  (JP) .............................. P2002-034605
Feb. 12, 2002  (JP) .............................. P2002-034606

(51) Int. Cl.
    *C08J 11/04*        (2006.01)
(52) U.S. Cl. .............. 521/40; 521/40.5; 521/41; 521/47
(58) Field of Classification Search .................... 521/40, 521/40.5, 41, 47
    See application file for complete search history.

(56) References Cited

U.S. PATENT DOCUMENTS

| 4,138,534 A | 2/1979 | Tedesco |
| 5,569,713 A | 10/1996 | Lieberman |
| 5,876,644 A | 3/1999 | Nichols et al. |
| 6,217,804 B1 | 4/2001 | Lieberman |

FOREIGN PATENT DOCUMENTS

| EP | 0 906 817 | 4/1999 |
| EP | 1 055 500 | 11/2000 |
| EP | 1055500 A2 | 11/2000 |
| EP | 1 107 054 | 6/2001 |
| JP | 09-114377 | 5/1997 |
| JP | 09-257569 | 10/1997 |
| JP | 2000198116 | 7/2000 |
| JP | 2001-254024 | 9/2001 |
| JP | 2001254024 | 9/2001 |
| WO | WO 00/46004 | 8/2000 |
| WO | WO 01/17742 | 3/2001 |

OTHER PUBLICATIONS

European Search Report dated Jul. 18, 2006.
Japanese Office Action issued on Jun. 6, 2007.

*Primary Examiner* — Edward J Cain
(74) *Attorney, Agent, or Firm* — SNR Denton US LLP (57) ABSTRACT

A system to recycle plastics, which enables a supply of recycled plastics having a stable quality required for the recycled products. A system to recycle a used plastic material as a resin material including (a) means to sort used plastic materials for the purpose of recycling said used plastic materials, (b) means to crush and melt said used plastic material after it has been sorted, (c) reviving means to regain a desired property, and (d) means to measure a physical property of a reclaimed plastic after it has been revived and to indicate said measured physical property for quality assurance.

8 Claims, 1 Drawing Sheet

SYSTEM FOR RECYCLING A USED PLASTIC, METHOD FOR REPROCESSING A USED ABS RESIN, AND RECLAIMED ABS RESIN

CROSS-REFERENCE TO RELATED APPLICATIONS

This application claims priority to and is a continuation of U.S. patent application Ser. No. 10/504,394, filed Aug. 11, 2004. Application Ser. No. 10/504,394 is the National Stage Entry of PCT/JP03/01432, which claims priority to Japanese Patent Application No. JP 2002-34605, filed Feb. 12, 2002 and Japanese Patent Application No. JP 2002-34606, filed Feb. 12, 2002. The disclosures of all of these applications are incorporated herein by reference in their entireties to the extent permitted by law.

BACKGROUND OF THE INVENTION

The present general inventive concept relates to a system for recycling a used plastic material, and more particularly to a recycling system which enables revival of a physical property of a used plastic material, and quality assurance of a reclaimed plastic.

In addition, the present general inventive concept relates to a method for reprocessing a used ABS (acrylonitrile-butadiene-styrene) resin and a reclaimed ABS resin, preferably relates to a method for reprocessing a used ABS resin, which improves a used ABS resin in impact strength by incorporating thereinto an unused or used ABS resin having such a physical property feature that the impact strength is high, enabling a reclaimed resin to be used in an application which requires the same or higher physical property, and a reclaimed ABS resin obtained by the method.

In recent years, from the viewpoint of saving resources and protecting the environment, various proposals of recycling of materials have been made. Laws concerning recycling, including Home Appliance Recycling Law, are established, and a variety of techniques and systems for recycling plastics have been proposed.

As a conventional way of reuse of plastics, for example, utilization of a used plastic as a fuel or a blast furnace reducing material (Japanese Patent No. 3095739) for the purpose of energy recovery, namely, so-called primary utilization is frequently made. Recycling of waste as materials is mainly performed in general-purpose applications, such as building materials and utensils for daily use. The reason for this resides in that the plastics salvaged are difficult to separate from one another and the physical properties of the plastics deteriorate due to the mechanical or thermal experience in the remolding, so that the plastics salvaged cannot be reused in the application similar to the application in which the original products are used. On the other hand, recycling of a plastic as a functional resin containing a reclaimed plastic has been realized; however, the utilization rate in this recycling is as low as about several tens %. The utilization rate is a value determined by the following formula.

Utilization rate(%)=(Weight of reclaimed plastic)/{(Weight of reclaimed plastic)+(Weight of original plastic)}×100

Another reason for difficulty of the recycling of plastics as materials is that used plastic materials are difficult to constantly obtain. The products on the market have different needs and colors, and therefore plastic materials of the same type in a satisfactory amount are difficult to obtain, and the plastic materials cannot be strictly separated from one another, thus making the quality assurance difficult.

A recycling system has been proposed in which recycling treatments for individual parts constituting a product are collectively controlled from the stage of raw materials to the final stage of disposal of the product to utilize the reclaimed plastics in the same product (Japanese Patent Application Publication No. 2000-181958). However, this system is unprofitable and difficult to apply to general-purpose resins. In addition, a problem in that the reclaimed plastic cannot always be desirably colored is pointed out, and thus this system has a problem in that the system is difficult to apply to the products being on the market or currently used.

ABS resins are widely used in the production of inexpensive, durable products. The ABS resins have high durability and hence are used as basic materials in the production of parts for products, such as computer housings, television sets, and automobiles. Recently, as we are becoming increasingly environmentally conscious, in addition to metal materials which have conventionally been recycled, recycling and reuse of petrochemical products are more vigorously attempted. Laws, such as recycle, waste law, and Containers and Packaging Recycling Law, have been established, and hence, in the product groups of large-size household appliances, automobiles, and the like, recycling of plastics is being promoted. However, in the above recycling of plastics, thermal recycling using the plastic as a heat source, or recycling for cascade utilization in which lowered physical properties of the reclaimed plastics are not a fatal problem is mainly conducted. Needless to say, the ABS resin is not an exception.

The reason that the above-mentioned recycling method is mainly employed in the recycling of plastics resides in that a change with time during the use of the plastic or mixing of foreign matter or heat experience during the recycling of the plastic causes the reclaimed plastic to have physical properties lowered, thus making recycling of the plastic as a material (material recycling) difficult. However, for more effectively utilizing used plastics, material recycling is preferred. Therefore, various studies have been made on the material recycling of plastics. The present inventors have found that, by adding to a used resin a resin different from the used resin, the used resin can be prevented from suffering quality deterioration or can be improved in the quality, and they have previously filed a patent application (Japanese Patent Application No. 2001-093981).

As mentioned above, conventionally, in the recycling of plastics, especially in the material recycling, there have been technical problems, e.g., (a) a problem of the lowering of physical properties including strength, (b) a problem in that the utilization rate is low, that is, the content of the reclaimed plastic in the recycled product is low, and (c) a problem of color in that there is the limitation of changing the color of the reclaimed plastic from a pale color to a dark color, thus making it difficult to color the reclaimed plastic with a desired color.

In view of the above, it is the first object of the present general inventive concept to provide a collective recycling system for used plastic materials, including collection and separation of resins and selection for reuse, which system can solve or improve the above problems, and further can be widely applied to general-purpose resins, such as products which are on the market or currently used.

On the other hand, ABS resins generally have excellent physical properties, such as tensile strength, flexural strength, and impact strength, and are relatively inexpensive, and hence used in a wide variety of household appliances and the like. Therefore, the ABS resins are one of resins demanded to be recycled as materials, and various studies have been made on the technique for reprocessing ABS resins including a method for separating plastics.

The present inventors have made various studies on the technique for reprocessing ABS resins. Physical properties of a reclaimed ABS resin were measured and compared with the physical properties of an unused ABS resin. As a result, it has been found that, in the physical properties, especially the impact strength is markedly lowered. The impact strength as a physical property is the most unique feature of the ABS resin, and is a very important property in the selection of the resin as a material, as compared to the other physical properties. Specifically, the ABS resin has high impact strength, and therefore, generally, the application in which the ABS resin is used requires excellent impact strength. In the reuse of the ABS resin, when the reclaimed ABS resin is difficult to use in the application which requires high impact strength, the application of the reclaimed ABS resin is limited, so that the cost for recycling is increased, leading to a failure to promote material recycling of the ABS resin. Therefore, in the method for reprocessing the ABS resin, the improvement of the impact strength is an important task.

Further, another task of the use of the reclaimed resin is coloring of the resin. In the use of the reclaimed resin in various parts for products, especially in the use of the reclaimed resin in the original application (part), coloring of the reclaimed resin with a desired color is required. However, in recycling of the ABS resin, it is difficult to color the reclaimed resin with a desired color while reviving the physical property, e.g., impact strength as mentioned above.

In view of the above, it is the second object of the present general inventive concept to enable a used ABS resin to be reclaimed and reused in the application which requires excellent physical property, for example, the original application or the application similar to the application in which the ABS resin is used.

SUMMARY OF THE INVENTION

The present inventors have conducted extensive and intensive studies with a view toward solving the above-mentioned problems. As a result, they have found that, by the recycling system in which the used plastic materials to be recycled are not finely separated by the material or structure, but the used plastic materials are sorted by the target value of physical property or the application of the reclaimed plastic, and crushed and melted and then, subjected to revival treatment for achieving the item or value required for the recycling, and a physical property of the reclaimed plastic obtained is measured for quality assurance, the first object is attained.

Specifically, products disposed of have conventionally been finely separated for reuse by the structure of PC (polycarbonate), ABS (acrylonitrile/butadiene/styrene), PP (polypropylene), or PVC (polyvinyl chloride) or the use history, but, in the present general inventive concept, by roughly separating them by the purpose of recycling (e.g., stiffness, strength, or color), the cumbersome operation and cost for the collection and separation are reduced, achieving a profitable recycling system. Further, in the recycling system of the present general inventive concept, by reviving the used plastic material so as to regain a property required in the recycling, the application of the reclaimed plastic is expanded and the utilization rate for the recycled product is improved. In addition, by measuring a physical property of the reclaimed plastic for quality assurance, the reclaimed plastic can be used in an appropriate application, thus improving the utilization for the recycled product.

Specifically, the present general inventive concept is directed to:

(1) a system for recycling a used plastic material as a resin material, the recycling system being characterized in that it has (a) means for sorting used plastic materials by the purpose of recycling, (b) means for crushing and melting the used plastic material sorted, (c) reviving means for regaining a desired property, and (d) means for measuring a physical property of a reclaimed plastic revived and indicating the measured physical property for quality assurance;

(2) the recycling system according to item (1) above, characterized in that the means for sorting used plastic materials by the purpose of recycling need not separate an impurity as long as a physical property required for the reclaimed plastic is satisfied; and (3) the recycling system according to item (1) above, characterized in that the means for sorting used plastic materials by the purpose of recycling does not separate resins which are compatible with each other.

In addition, the present general inventive concept is directed to:

(4) the recycling system according to item (1) above, characterized in that the means for sorting used plastic materials includes measurement means for a transparent resin portion in a plastic waste material containing a transparent resin;

(5) the recycling system according to item (4) above, characterized in that the resin waste material containing a transparent resin is a housing for magnetic recording product, and the transparent resin portion is a window material or a flange in the housing;

(6) the recycling system according to item (1) above, characterized in that the means for sorting used plastic materials separates a resin containing an antistatic agent; and (7) the recycling system according to item (6) above, characterized in that the resin containing an antistatic agent is a resin in a lid portion of a magnetic recording product.

Further, the present general inventive concept is directed to:

(8) the recycling system according to item (1) above, characterized in that the property regained by the reviving means is at least one property selected from the group consisting of density, water absorption, coefficient of expansion, tensile strength, elongation at breakage, flexural strength, flexural modulus, Izod impact strength, notched Izod impact strength, heat deformation temperature, flame retardancy, shrinkage factor, volume resistance, permittivity, weld elongation at breakage and tensile strength, MFR (melt flow rate), hue, degree of transparency, and texture;

(9) the recycling system according to item (1) above, characterized in that the reviving means is at least one means selected from the group consisting of changing the structure by an oxidation and reduction, addition, or elimination reaction, increasing or reducing the molecular weight, controlling the physical property by an additive, controlling by increasing or reducing the content of a constituent or changing the composition, and controlling by blending resins;

(10) the recycling system according to item (1) above, characterized in that the measurement of a physical property of the reclaimed plastic includes a measurement of impact strength and/or hue; and (11) the recycling system according to item (1) above, characterized in that the measurement of a physical property of the reclaimed plastic includes a measurement of the content of a rubber component in the reclaimed plastic.

Further, the present general inventive concept is directed to:

(12) the recycling system according to item (1) above, characterized in that the used plastic material is a plastic material salvaged under specific conditions;

(13) the recycling system according to item (1) above, characterized in that the used plastic material is at least one resin selected from the group consisting of a styrene resin, a polycarbonate resin, and an alloy of a polycarbonate resin and an ABS resin;

(14) the recycling system according to item (1) above, characterized in that the used plastic material is a plastic material salvaged from a used magnetic recording product; and (15) the recycling system according to item (14) above, characterized in that the used plastic material is a mixture of an ABS (acrylonitrile/butadiene/styrene) resin and an AS (acrylonitrile/styrene) resin or a mixture of a HIPS (high impact polystyrene) resin and a PS (polystyrene) resin.

Further, the present general inventive concept is directed to:

(16) the recycling system according to item (14) above, characterized in that the used plastic material is a mixture of an ABS (acrylonitrile/butadiene/styrene) resin and an AS (acrylonitrile/styrene) resin salvaged from a used magnetic recording product for broadcasting station;

(17) the recycling system according to item (14) above, characterized in that it is preliminarily provided with a means for erasing information recorded on the used magnetic recording product; and (18) the recycling system according to item (1) above, characterized in that the used plastic material contains an antistatic agent.

Further, the present general inventive concept is directed to:

(19) a plastic material characterized in that it contains a reclaimed plastic obtained by a system for recycling a used plastic material as a resin material, wherein the recycling system has (a) a means for sorting used plastic materials by the purpose of recycling, (b) a means for crushing and melting the used plastic material sorted, (c) a reviving means for regaining a desired property, and (d) a means for measuring a physical property of the reclaimed plastic revived and indicating the measured physical property for quality assurance;

(20) an ABS (acrylonitrile/butadiene/styrene) resin characterized in that it contains an ABS resin obtained by a system for recycling a used plastic material as a resin material, wherein the recycling system has (a) a means for sorting used plastic materials by the purpose of recycling, (b) a means for crushing and melting the used plastic material sorted, (c) a reviving means for regaining a desired property, and (d) a means for measuring a physical property of the reclaimed plastic revived and indicating the measured physical property for quality assurance; and (21) a polycarbonate resin characterized in that it contains a polycarbonate resin obtained by a system for recycling a used plastic material as a resin material, wherein the recycling system has (a) a means for sorting used plastic materials by the purpose of recycling, (b) a means for crushing and melting the used plastic material sorted, (c) a reviving means for regaining a desired property, and (d) a means for measuring a physical property of the reclaimed plastic revived and indicating the measured physical property for quality assurance.

Further, the present general inventive concept is directed to:

(22) a resin shaped article characterized in that it contains an ABS (acrylonitrile/butadiene/styrene) resin comprising an ABS resin obtained by a system for recycling a used plastic material as a resin material, wherein the recycling system has (a) a means for sorting used plastic materials by the purpose of recycling, (b) a means for crushing and melting the used plastic material sorted, (c) a reviving means for regaining a desired property, and (d) a means for measuring a physical property of the reclaimed plastic revived and indicating the measured physical property for quality assurance;

(23) a resin shaped article characterized in that it contains a polycarbonate resin comprising a polycarbonate resin obtained by a system for recycling a used plastic material as a resin material, wherein the recycling system has (a) a means for sorting used plastic materials by the purpose of recycling, (b) a means for crushing and melting the used plastic material sorted, (c) a reviving means for regaining a desired property, and (d) a means for measuring a physical property of the reclaimed plastic revived and indicating the measured physical property for quality assurance; and (24) the resin shaped article according to item (22) or (23) above, characterized in that it is a magnetic recording product.

On the other hand, the present inventors have found that, by incorporating, into a used ABS resin (A) having an impact strength lowered due to the usage, an unused ABS resin (B) or another used ABS resin (C), preferably an unused ABS resin (B) or another used ABS resin (C) having an impact strength higher than that of the used ABS resin (A), the used ABS resin (A) can be reproduced and reused, so that the second object is attained. Further, the present inventors have found that a coloring technique which is advantageous from a commercial point of view in the recycling of ABS resin can be provided.

Specifically, the present general inventive concept is directed to:

(25) a method for reprocessing a used ABS resin (A), characterized by separating from a used product an ABS (acrylonitrile/butadiene/styrene) resin in an independent form or in the form of a mixture with another resin, and incorporating into a used ABS resin (A) separated an unused ABS resin (B) and/or another used ABS resin (C) to improve the used ABS resin (A) in physical property;

(26) the reprocessing method according to item (25) above, characterized in that the ABS (acrylonitrile/butadiene/styrene) resin is separated in the form of a mixture with an AS (acrylonitrile/styrene) resin from a used product; and (27) the reprocessing method according to item (25) above, characterized in that the unused ABS (acrylonitrile/butadiene/styrene) resin (B) and/or another used ABS resin (C) has an impact resistance higher than that of the used ABS resin (A) separated from a used product.

In addition, the present general inventive concept is directed to:

(28) the reprocessing method according to item (25) above, characterized in that the unused ABS (acrylonitrile/butadiene/styrene) resin (B) and/or another used ABS resin (C) is incorporated so that a value obtained from the formula 1 below is equivalent to or higher than the impact resistance required for a reclaimed ABS resin Formula 1={Content of used ABS resin$(A)$}×{Impact resistance of used ABS resin$(A)$}+{Content of unused ABS resin$(B)$}×{Impact resistance of unused ABS resin$(B)$}+{Content of used ABS resin$(C)$}×{Impact resistance of used ABS resin $(C)$};

(29) the reprocessing method according to item (28) above, characterized in that the value obtained from the formula 1 in item (28) above is 80 percent or more of the impact resistance of the ABS (acrylonitrile/butadiene/styrene) resin (A) separated from a used product, as measured in a state in which the ABS resin (A) is unused; and (30) the reprocessing method according to item (28) above, characterized in that the value obtained from the formula 1 in item (28) above is 15 J/m or more.

Further, the present general inventive concept is directed to:

(31) the reprocessing method according to item (25) above, characterized in that the unused ABS (acrylonitrile/butadiene/styrene) resin (B) and/or another used ABS resin (C) has an impact resistance higher than and a melt flow rate lower than those of the used ABS resin (A) separated from a used product;

(32) the reprocessing method according to item (25) above, characterized in that a pigment is further incorporated into the used ABS (acrylonitrile/butadiene/styrene) resin (A) separated; and (33) the reprocessing method according to item (25) above, characterized in that the used product is a used magnetic recording product.

Further, the present general inventive concept is directed to:

(34) a reclaimed ABS resin characterized in that it includes a used ABS (acrylonitrile/butadiene/styrene) resin (A) separated in an independent form or in the form of a mixture with another resin from a used product, and an unused ABS resin (B) and/or another used ABS resin (C) incorporated into the used ABS resin (A);

(35) the reclaimed ABS resin according to item (34) above, characterized in that the used ABS (acrylonitrile/butadiene/styrene) resin (A) is an ABS resin separated in the form of a mixture with an AS (acrylonitrile/styrene) resin from a used product; and (36) the reclaimed ABS resin according to item (34) above, characterized in that the unused ABS (acrylonitrile/butadiene/styrene) resin (B) and/or another used ABS resin (C) has an impact resistance higher than that of the used ABS resin (A) separated from a used product.

Further, the present general inventive concept is directed to:

(37) the reclaimed ABS resin according to item (34) above, characterized in that the unused ABS (acrylonitrile/butadiene/styrene) resin (B) and/or another used ABS resin (C) is incorporated so that a value obtained from the formula 1 below is equivalent to or higher than the impact resistance required for the reclaimed ABS resin Formula 1={Content of used ABS resin($A$)}×{Impact resistance of used ABS resin($A$)}+{Content of unused ABS resin($B$)}×{Impact resistance of unused ABS resin($B$)}+{Content of used ABS resin($C$)}×{Impact resistance of used ABS resin ($C$)};

(38) the reclaimed ABS resin according to item (37) above, characterized in that the value obtained from the formula 1 in item (37) above is 80 percent or more of the impact resistance of the used ABS (acrylonitrile/butadiene/styrene) resin (A) separated from a used product, as measured in a state in which the ABS resin (A) is unused; and (39) the reclaimed ABS (acrylonitrile/butadiene/styrene) resin according to item (37) above, characterized in that the value obtained from the formula 1 in item (37) above is 15 J/m or more.

Further, the present general inventive concept is directed to:

(40) the reclaimed ABS resin according to item (34) above, characterized in that the unused ABS (acrylonitrile/butadiene/styrene) resin (B) and/or another used ABS resin (C) has an impact resistance higher than and a melt flow rate lower than those of the used ABS resin (A) separated from a used product;

(41) the reclaimed ABS resin according to item (34) above, characterized in that the used ABS (acrylonitrile/butadiene/styrene) resin (A) separated has a pigment further incorporated;

(42) the reclaimed ABS (acrylonitrile/butadiene/styrene) resin according to item (34) above, characterized in that the used product is a used magnetic recording product;

(43) a resin shaped article comprising a reclaimed ABS (acrylonitrile/butadiene/styrene) resin which includes a used ABS (acrylonitrile/butadiene/styrene) resin (A) separated in an independent form or in the form of a mixture with another resin from a used product, and an unused ABS resin (B) and/or another used ABS resin (C) incorporated into the used ABS resin (A); and (44) the resin shaped article according to item (43) above, which is a magnetic recording product.

BRIEF DESCRIPTION OF THE DRAWING

These features of embodiments of the present general inventive concept will be described in more detail with reference to the accompanying drawings, in which.

DETAILED DESCRIPTION OF THE PRESENTLY PREFERRED EMBODIMENTS

1. System for Recycling a Used Plastic Material

Hereinbelow, the system for recycling a used plastic material of the present general inventive concept will be described in detail.

In the "means for sorting used plastic materials by the purpose of recycling" in the present general inventive concept, used plastic materials can be sorted utilizing a known identification method for plastic material, such as an identification method by IR or an identification method by burning or dissolution.

In the recycling system of the present general inventive concept, for reducing the cumbersome operation and cost for the collection and separation of used materials without fine separation which has been performed in a conventional recycling system, it is preferred that no separation of an impurity is conducted as long as the physical property required for a reclaimed plastic is satisfied. More specifically, for example, the sorting means does not separate resins which are compatible with each other. In the present general inventive concept, the state of the resins compatible with each other is not limited to a state of the resins such that molecules are mixed with one another but involves a state of the resins containing microscopic phase separation. Examples of resins which are compatible with each other include resins each of which monomer constituting the resin is the same or of a similar or the same series. As an example of the resins which are compatible with each other, there can be mentioned a combination of an ABS resin and a compound having a styrene unit, such as an AS (acrylonitrile/styrene) resin. When a plurality of resins are copolymers comprised of two or more monomers, as a resin compatible with another resin, a resin having the common monomer to the monomers constituting the copolymers can be used as a compatible resin. As the resins compatible with each other, combinations, such as ABS/PC (polycarbonate), ABS/PET (polyethylene terephthalate), ABS/PVC (polyvinyl chloride), ABS/PPE (polyphenylene ether), ABS/PSF (polysulfone), ABS/PBT (polybutylene terephthalate), ABS/nylon, HIPS/PPE (polyphenylene ether), HIPS (high impact polystyrene)/PMMA (polymethyl methacrylate), and HIPS/polyolefin, and combinations of different materials which are known to be compatible with each other may be used.

In the sorting means in the present general inventive concept, separation can be made in respect of a pigment or a dye contained in the used plastic material. This is especially preferred when the reclaimed plastic is needed to be colored with a desired color in the recycling of plastics.

In the sorting means in the present general inventive concept, it is preferred that a resin containing an antistatic agent is separated and removed. This is because a more uniform reclaimed resin can be obtained. The resin containing an antistatic agent is used in, for example, a lid portion of a magnetic recording product. Generally, it is difficult to separate and remove an antistatic agent after crushing and dissolving a used product, and therefore, it is preferred that a part comprised of a resin containing an antistatic agent is separated from a used product and then the remaining part is crushed and dissolved.

As a preferred mode of the sorting means in the present general inventive concept, as described below in detail, there can be mentioned sorting by a measurement for a transparent resin portion in a plastic waste material containing a transparent resin.

Resins salvaged are generally limited by the products in which the resins are used. For example, resins used in magnetic recording products are comprised mainly of a combination of HIPS (shell body) and GPPS (general-purpose polystyrene) (the latter: window portion) in a VHS tape or a combination of ABS (shell body) and AS (window portion) in an 8 mm or DV minicassette. Therefore, by analyzing not a housing body which possibly has different colors but a transparent resin (material for a window portion) which is necessarily contained when recovering magnetic recording products, the type of another resin mixed can be easily identified. When the transparent portion is comprised of an AS resin, another resin mixed can be identified as ABS. On the other hand, when the transparent portion is comprised of PS, another resin mixed can be identified as HIPS. This method can be applied to any of a cassette shell as such, parts disintegrated, and crushed indefinite pellets. It is preferred that the types of resins are identified and then the individual resins of the same type are crushed since suppression of mixing of a different resin is easy.

With respect to the measurement for the transparent resin portion, there is no particular limitation, and a known identification method for plastic material, such as an identification method by IR or an identification method by burning or dissolution, can be used. Especially, a measurement by transmission FT-IR (infrared spectrum) is quick and easy.

The measurement by transmission FT-IR (infrared spectrum) used as the measurement for the transparent resin portion has the following advantages. Specifically, a colored resin hardly transmits a light, and hence the use of the above method for the colored resin is very difficult. However, many of the resins used in household appliances are colored. Therefore, a method of identifying a resin by reflection FT-IR has been proposed, but, in this case, the measurement for a black resin or a resin having a coated surface is difficult. In the present general inventive concept, a measurement is made with respect to the transparent portion of the resin in a household appliance to identify the type of the resin, making it possible to avoid the above-mentioned difficulty in the measurement. For example, in separation of the resins in a housing of a magnetic recording product, when the transparent window portion of the housing is comprised of PS, it is judged that the colored portion of the housing is comprised of HIPS, and, on the other hand, when the transparent window portion of the housing is comprised of AS, it is judged that the colored portion of the housing is comprised of ABS. The judgement can be easily made by observing an absorption band: $2,200^-$ $cm$ of a nitrile group.

Resins used in housing materials (including a shell material) for household appliances are mainly HIPS and ABS, and these resins, however, are not compatible very well and therefore, when they are mixed with each other, the physical properties are markedly lowered, thus making reuse of them very difficult. It is noted that, even when PS is mixed with HIPS or AS is mixed with ABS, the physical properties are almost not lowered. From the above, by the use of the sorting means in the above embodiment, easy transmission FT-IR can be used, thus improving the resin sorting operation in speed and accuracy and providing an economical advantage.

In the present general inventive concept, with respect to the "means for crushing the used plastic material sorted", there is no particular limitation, and a known means using, e.g., a crusher, a grinding mill, or a grinder may be employed. Further, with respect to the means for melting the used plastic material crushed, there is no particular limitation, and a known means may be used.

With respect to the property regained by the reviving means in the present general inventive concept, there is no particular limitation, and it may be various physical properties essential in the use of the reclaimed plastic. Specifically, examples of the properties include density, water absorption, coefficient of expansion, tensile strength, elongation at breakage, flexural strength, flexural modulus, Izod impact strength, notched Izod impact strength, heat deformation temperature, flame retardancy, shrinkage factor, volume resistance, permittivity, weld elongation at breakage and tensile strength, and MFR (melt flow rate). The degree of the property regained cannot be generally specified since it varies depending on the application of the reclaimed plastic and the like, but, as preferred examples, there can be mentioned a physical property regained by 80 percent or more, preferably 90 percent or more of the physical property of the resin having the same composition, as measured in a state in which the resin is unused. The above properties include hue, degree of transparency, and texture.

As the reviving means in the present general inventive concept, a method using a general physical change or chemical reaction can be utilized. Specifically, a known technique, such as changing the structure by an oxidation and reduction, addition, or elimination reaction; increasing or reducing the molecular weight; controlling the physical property by an additive, such as a plasticizer, a cross-linking agent, or a dispersant; controlling by increasing or reducing the content of a constituent, such as an organic or inorganic pigment, a rubber component, or gas, or by changing the composition; or controlling by blending resins, can be used. More specifically, as an example of the controlling by blending resins, there can be mentioned a method of mixing with a used plastic material a plastic having a property to be regained higher than that of the used plastic material. In this case, the resin mixed may be either an unused resin (virgin material) or a used plastic material, but, from the viewpoint of effective utilization of resources, it is preferred to use a used plastic material.

The reviving means can control the color by setting a range by means of a criteria sample or a calorimeter. Further, texture can be controlled by adding an arbitrary inorganic pigment or organic pigment or a natural material.

In the present general inventive concept, for the use in recycled products, in addition to the above reviving means, processing or a method according to the purpose can be used. For example, purification of a reclaimed plastic, reduction of a pigment, dissolution, centrifugal separation, settling, filtration, drying, cleaning, or control of the pellet size can be made.

The form of the reclaimed plastic obtained by the above-mentioned technique or method including the reviving means can be a general pellet form or arbitrarily processed into a pasta form if desired. Thus, by the reviving means and another processing if desired, there can be provided a raw material for preparing a recycled product which can be used in a wide variety of applications. Particularly, the reclaimed plastic obtained by the present general inventive concept has an advantage in that it can be used in an application which is the same as or similar to the application in which the plastic before being recycled is used. Here, the term "similar" application means an application which is not the same as the application in which the plastic before being recycled is used but requires an equivalent physical property.

Further, the present general inventive concept includes a means for measuring a physical property of the reclaimed plastic revived and indicating the measured physical property for quality assurance. With respect to the physical property, there is no particular limitation, and examples include a physical property essential for the reclaimed plastic being used. Specifically, examples include the property regained by the reviving means. In the above means, especially, it is preferred that an impact strength, the content of a rubber component in the reclaimed plastic, or hue is measured.

As the quality assurance, in addition to indication of the measured physical property, indication of information including conditions for reprocessing of the recycled product is preferred. For example, in a general molding machine, indication of information from the resin, such as heat history or an MFR, and optimal molding conditions are preferred.

Thus, there can be established a recycling system according to the property required, which system controls the quality of the resin throughout from obtaining a used plastic material from parts or products disposed of, collection, sorting, reviving according to the purpose, to introduction into a recycled product. The recycling system of the present general inventive concept enables quality assurance, and hence the resultant reclaimed resin can be reprocessed as a high quality resin. Therefore, the reclaimed resin can be used in the application which is the same as the application in which the resin before being recycled is used. The reviving means can revive a resin so as to have a more excellent function and higher added value than those of the resin before being recycled. Further, the type, composition, or use history of the used plastic as a raw material for recycling is not finely specified, and therefore stable supply of the recycling raw material can be made. In addition, the life of a plastic can be extended and generation of carbon dioxide upon burning can be reduced, as compared to a conventional method for the purpose of energy recovery.

In the recycling system of the present general inventive concept, any material can be applied as long as it is a used plastic material and there is no particular limitation. The used plastic material may be a plastic material disposed of, which has been used in products, semi-fabricated products, or parts of, for example, electrical appliances, office appliances, vehicles, or miscellaneous goods, or ones discharged in a fabrication plant as discarded materials of runner materials or raw material pellets. From the viewpoint of reuse as resources, the used resins generated in a plant and those salvaged from the products to specifications (which are the same product or belong to the same product group) generally have consistent physical properties, and therefore they are more preferred from the viewpoint of reuse as resources. Examples of the products to specifications include recording media related products (videocassette shell), more specifically, videocassette for professional use and 8 mm videocassette and DV cassette for consumer use, household game machine (controller), and portable phone. Especially, in the present general inventive concept, it is preferred that the used plastic material is a used plastic material salvaged from a used magnetic recording product. With respect to the magnetic recording product, there is no particular limitation, and examples include the above-mentioned videocassettes and music tape cassettes. The magnetic recording product includes not only a magnetic recording medium but also a housing for protecting it, such as a casing and a shell. In the present general inventive concept, the used plastic material may be a reclaimed plastic obtained by the recycling system of the present general inventive concept.

It is preferred that the used plastic material in the recycling system of the present general inventive concept is a plastic material salvaged under specific conditions. The wording "salvaged under specific conditions" means: (a) that a plastic material is salvaged from a single group of product; or (b) that a plastic material is salvaged from a product of which distribution can be grasped. As the "product of which distribution can be grasped", preferred are products such that the use conditions of the individual products are not largely different and stable collection of the products is possible. Specifically, examples of the products include products for so-called professional use in which a contract with respect to the supply and collection of the products is made between companies. More specifically, examples include magnetic recording products for use in broadcasting station. In addition, examples include products obliged to be collected by Home Appliance Recycling Law or the like. Further, examples include products which must be subjected to specific waste treatment from the viewpoint of prevention of environmental pollution and the like. Further, there can be mentioned products, e.g., PET bottles or trays, of which system for separation and collection has been established. Furthermore, examples include products having therein a label, such as a tag, which can indicate the composition of materials, the use conditions, and the like.

As mentioned above, the plastic materials salvaged under specific conditions frequently have consistent physical properties and hence have an advantage in that they can be easily-reused as resources. When the plastic material is obtained from the above-described products, the reclaimed plastic may be either reused in the same product as the product before the recycling or used in another product.

With respect to the composition of the used plastic material, there is no particular limitation. Especially, it is preferred that the used plastic material is at least one resin selected from the group consisting of a styrene resin, a PC (polycarbonate) resin, and an alloy of a PC resin and an ABS resin. Further, it is more preferred that the used plastic material is a mixture of an ABS resin and an AS resin or a mixture of a HIPS resin and a PS resin, and it is especially preferred that the used plastic material is a mixture of an ABS resin and an AS resin salvaged from a used magnetic recording product for broadcasting station.

Styrene resins are widely used, and, especially, ABS is known as a resin excellent in strength and cost. In the present general inventive concept, the styrene resin may be any known resin as long as it is a resin having styrene as a monomer constituent. Examples of styrene resins include ABS resins, AS resins, and PS.

Conventionally, reuse of styrene resins inevitably has problems of discoloration due to heat experience and lowering of the impact strength. In addition, the styrene resin contained may considerably lower the physical properties, and therefore classification of resins must be strictly made. However, the resins have close applications and contain an additive or contents, and hence are difficult to separate. For solving the above problems, the recycling system of the present general inventive concept can propose an appropriate use method. Particularly, ABS and AS resins are used in the same product or close applications, and are difficult to separate. Therefore, even when they are mixed at the collection, they are subjected to reviving means so as to revive the target value of physical property for reuse to assure the quality, thus enabling reuse as a recycled product. Thus, by changing the conventional classification by structure to the separation in the present general inventive concept by function or purpose, the process can be simplified.

In the above case, with respect to the lowering of the physical property due to mixing of ABS and AS, addition of a known compatibilizer, or an arbitrary additive or a resin having a partially different physical property prevents lowering of the physical property strength. For example, by changing the collection method to a known method using limonene or the like, the molecular weight lowering or discoloration due to heat decomposition can be prevented. Thus, there can be realized a system which can efficiently recycle styrene resins including ABS, which have conventionally been strictly separated for reuse and reused inevitably with a property lowered.

PC is widely used in optical materials and CD. Reuse of a material from optical materials in the equivalent product, including a collection method, is difficult. The reason for this is that mixing of impurities at the collection and lowering of the molecular weight due to hydrolysis occur. Generally, only a housing or the like is reused. In CDs, a metal film is deposited or a lubricant is contained, and therefore PC is difficult to fully peel off or separate. For solving the above problems, the recycling system of the present general inventive concept can realize an appropriate use.

When PC used in CD or MD is reused in the equivalent product, PC with high purity can be collected by a known technique, such as peeling by means of an acid and a base (e.g., Japanese Patent Application Publication No. Hei 7-286064: method for treatment of optical disc waste), a mechanochemical method, a method by abrasion (e.g., Japanese Patent No. 3236000), or a blasting method. In the present general inventive concept, in the above reviving means, by appropriately selecting or using in combination these techniques, resins can be collected for the purpose of recycling. In the application of a housing, collection can be made by the same method almost without lowering the physical property.

In PC, by the present general inventive concept, among the requirements for the product as an object of use, assurance of quality for coloring and strength can be made. In addition, like in the styrene resins, in PC, by changing the conventional classification by molecular structure to the separation in the present general inventive concept by function or purpose, the process for recycling can be simplified. Thus, there can be realized a system which can efficiently recycle PC which has conventionally been strictly separated for reuse and reused inevitably with a property lowered.

The used plastic in the present general inventive concept may contain various additives for resin, such as an antistatic agent, a coloring agent, a pigment, an antioxidant, a flame retardant, a plasticizer, a light resistance assistant, a compatibilizer, a surface treating agent, a modifier, a coloring agent (e.g., carbon black), glass fiber, paper, and nonwoven fabric.

In the present general inventive concept, when the used plastic material is obtained from a used magnetic recording product, it is preferred that a means for erasing information recorded on the used magnetic recording product is preliminarily provided. On magnetic recording products are often recorded company secrets, secrets of nation, or copyrighted music or literary works, drawings, or pictures, and there is generally a need to treat them to prevent the recorded information from going to a third party after the disposal. With respect to the means for erasing information, there is no particular limitation, and examples include a method of damaging a magnetic recording medium. A soft for erasing information is available.

Figure 1:
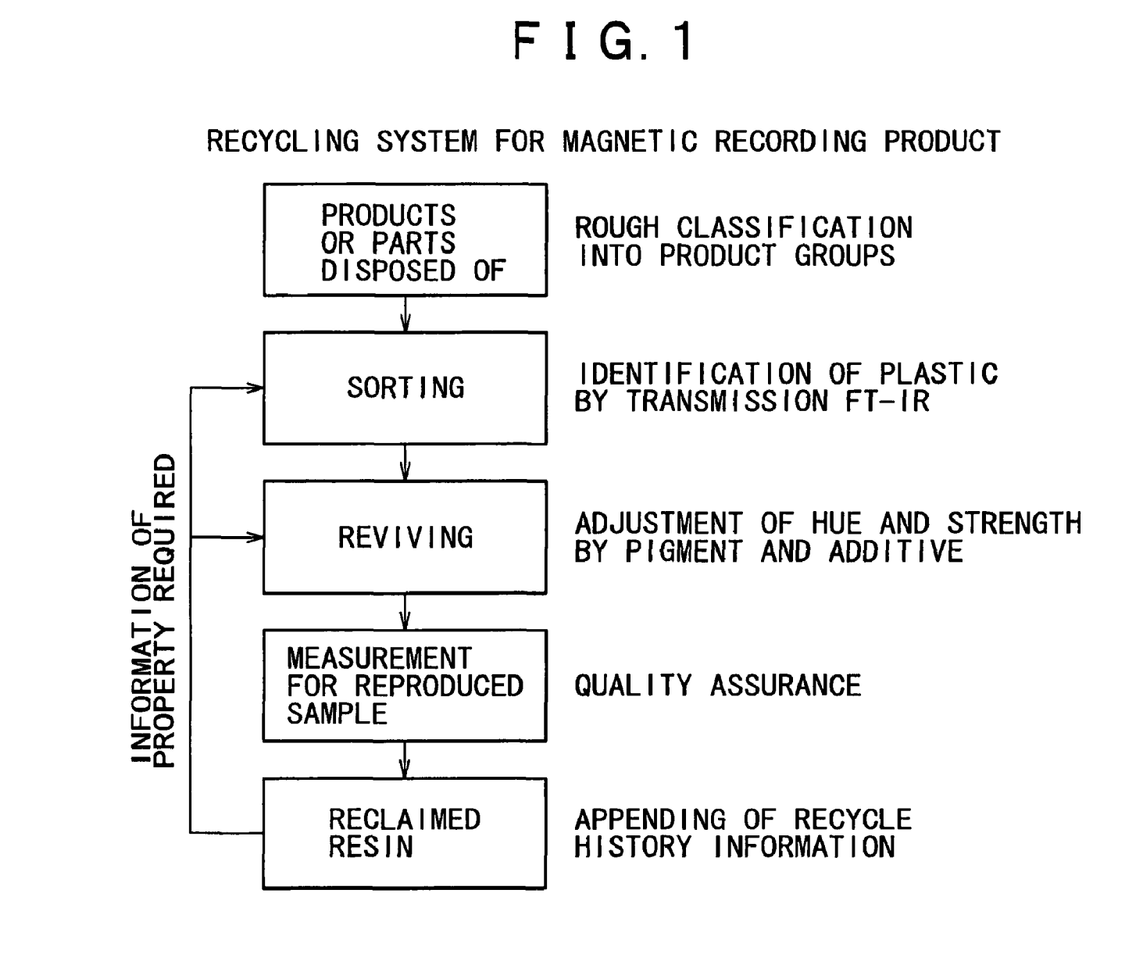
FIG. 1 is a schematic diagram of a recycling system for magnetic recording product as one embodiment of the recycling system of the present general inventive concept.

A schematic diagram of a recycling system for magnetic recording product as a specific embodiment of the recycling system of the present general inventive concept is illustrated in FIG. 1. Products or parts disposed of are first roughly classified into product groups. Then, plastics constituting the products or parts disposed of are identified by transmission FT-IR. The identification is conducted with respect to the transparent resin portion of the magnetic recording product. When the transparent resin portion is comprised of PS, it is judged that another resin mixed is HIPS, and, on the other hand, when the transparent resin portion is comprised of AS, it is judged that another resin mixed is ABS.

Next, the product is treated by a reviving means. In the magnetic recording product, especially coloring and strength are required, and therefore the hue and strength are adjusted by a pigment and an additive. Then, a physical property of the reclaimed plastic obtained is measured. Finally, recycle history information including the physical property measured is appended, thus providing a reclaimed plastic.

The present recycling system illustrated in FIG. 1 has advantages in the following items.

(1) The recycling system can be widely applied to general-purpose plastics for use in the products which are on the market or currently used. Therefore, availability of raw materials for recycling has no limitation, and further the reclaimed plastic can be used in a plurality of types of products.

(2) The purpose of recycling and the application are verified before collection or revival of products. For example, when obtaining a reclaimed plastic having a desired color, the criterion can be clarified using a differential calorimeter or a criteria sample at the collection.

(3) The reviving means established for regaining the property required for a reclaimed plastic can be utilized.

(4) When supplying a reclaimed plastic to recycled products, inconsistency or values of the quality of the reclaimed plastic are indicated. Further, conditions required for reuse, such as molding conditions, can be appended. In addition, an IC or history information can be attached. Further, formation of a database enables development in the related fields.

(5) The standards of or properties required for a reclaimed plastic can be specified by general items for representing the physical properties of the reclaimed plastic, and hence the reclaimed plastic has improved general-purpose properties. A soft, a calculation method, or the like, which can clarify a difference in physical property between a sample obtained and a recycled resin and reflect the difference to the revival work, can be used.

2. Method for Reprocessing a Used ABS Resin, and Reclaimed ABS Resin

Hereinbelow, the method for reprocessing a used ABS resin and the reclaimed ABS resin of the present general inventive concept will be described in detail.

In the reprocessing method of the present general inventive concept, a used ABS resin (A) is first separated from a used product. With respect to the used ABS resin (A) in the present general inventive concept, there is no particular limitation, and examples include commercially available ABS resins for general-purpose, high-stiffness, high-impact, wear-resistance, high-sliding, heat-resistance, transparence, high-luster, chemical-resistance, and coating. The ABS resin may contain various additives for resin, such as an antistatic agent, a coloring agent, a pigment, an antioxidant, a flame retardant, a plasticizer, a light resistance assistant, a compatibilizer, a surface treating agent, a modifier, a coloring agent (e.g., carbon black), glass fiber, paper, and nonwoven fabric. When the used ABS resin (A) is reused as a resource for use in the same application as the application in which the virgin material (which means an unused resin; this applies to the following) is used, it is more preferred that the used ABS resin (A) is an ABS resin of a general-purpose grade.

In the separation of the used ABS resin (A), an ABS resin may be separated either in an independent form or in the form of a mixture with another resin. As the another resin, a resin compatible with ABS is preferred. Examples of resins compatible with ABS include AS (acrylonitrile-styrene) resins, PC (polycarbonate), PET (polyethylene terephthalate), PVC (polyvinyl chloride), PPE (polyphenylene ether), PSF (polysulfone), PBT (polybutylene terephthalate), and nylon. Of these, as the another resin, AS resins are preferred. In shaped parts or products of an ABS resin, as a material for a member used in a site requiring a transparent portion, such as a window, an AS resin is frequently used since it is readily deposited on the ABS resin. In recycling, considering the operation of disintegration and separation of deposited portions, the AS resin has properties that resemble those of the ABS resin, including compatibility, and therefore, the used ABS resin in the form of a mixture with the AS resin can be treated in the same manner as in the used ABS resin (A). In the present specification, the "used ABS resin (A)" includes an ABS resin mixture separated in the form of a mixture of an ABS resin and another resin from a used product.

With respect to the used product in the present general inventive concept, there is no particular limitation as long as it contains an ABS resin, and examples include all types of resin waste materials which have been used in electrical appliances, office appliances, vehicles, and miscellaneous goods. Alternatively, ones discharged in a fabrication plant as discarded materials of runner materials or raw material pellets may be used. The used products generated in a plant and the materials salvaged from the products to specifications (which are the same product or belong to the same product group) generally have consistent physical properties, and therefore they are more preferred from the viewpoint of reuse as resources. Examples of the products to specifications include recording media related products (videocassette shell), more specifically, videocassette for professional use and 8 mm videocassette and DV cassette for consumer use, household game machine (controller), and portable phone. Especially, in the present general inventive concept, it is preferred that the used product is a used magnetic recording product. With respect to the magnetic recording product, there is no particular limitation, and examples include the above-mentioned videocassettes and music tape cassettes. The magnetic recording product includes not only a magnetic recording medium but also a housing for protecting it, such as a casing and a shell.

In many cases, the used ABS resin (A) is, as mentioned above, obtained by separation from used products including discarded articles discharged from a plant and the like, and it may be in a state as discharged, or ground or pelletized after melting.

The used ABS resin (A) may contain the above-mentioned additive for resin, but it is preferred that the ABS resin content is 50% by weight or more. When the used ABS resin (A) includes a mixture of an ABS resin and another resin, such as an AS resin, it is preferred that the ABS resin content is 50% by weight or more, and it is preferred that the content of the another resin, e.g., AS resin is less than 50% by weight. For reusing the used ABS resin (A) as an ABS resin resource, it is preferred that the ABS resin content falls within the above range.

With respect to the unused ABS resin (B) or another used ABS resin (C) incorporated into the used ABS resin (A), there is no particular limitation, and they may contain the above-mentioned various additives for resin.

It is especially preferred that the unused ABS resin (B) and/or another used ABS resin (C) has an impact resistance higher than that of the used ABS resin (A) separated from a used product. For example, as the unused ABS resin (B) or used ABS resin (C), among commercially available ABS resins of various grades, such as general-purpose, high-stiffness, high-impact, wear-resistance, high-sliding, heat-resistance, transparence, high-luster, chemical-resistance, and coating grades, there can be mentioned ABS resins of a grade having an impact resistance higher than that of the used ABS resin (A). Alternatively, as the unused ABS resin (B) or used ABS resin (C), an ABS resin of a special grade, which is not commercially available but can be produced in a resin plant, may be used. The impact resistance is measured in accordance with ASTM 256 under conditions for the 12.7 mm notched impact test.

It is further preferred that the unused ABS resin (B) and/or another used ABS resin (C) has an impact resistance higher than and a melt flow rate lower than those of the used ABS resin (A) separated from a used product. The melt flow rate is measured in accordance with ISO-1133 under conditions at 220° C. at 98 N.

In the present general inventive concept, instead of or in addition to the unused ABS resin (B) and/or another used ABS resin (C), a resin compatible with an ABS resin may be added to the used ABS resin (A). The resin may be either an unused resin or a used resin. In the present general inventive concept, the state of the resins compatible with each other is not limited to a state of the resins such that molecules are mixed with one another but involves a state of the resins containing microscopic phase separation. Specifically, a state may be such that an ABS resin and a resin compatible with the ABS resin microscopically coexist.

Examples of resins compatible with an ABS resin include resins having monomers constituting ABS. Specifically, examples include resins having a styrene unit. The resin compatible with an ABS resin may be another different resin which is known to be compatible with an ABS resin as mentioned above.

With respect to the amount of the unused ABS resin (B) and/or another used ABS resin (C) added to the used ABS resin (A), there is no particular limitation. However, it is preferred that a physical property of the used ABS (A) is measured and, according to the value measured, the amount of the unused ABS resin (B) and/or another used ABS resin (C) incorporated is determined so that the physical property required for the reclaimed ABS resin is obtained. As the "physical property", it is preferred that an impact resistance is used as an index.

Specifically, it is preferred that the unused ABS resin (B) and/or another used ABS resin (C) is incorporated so that a value obtained from the formula 1 below is equivalent to or higher than the impact resistance required for the reclaimed ABS resin. The "equivalent to" or higher means about 80 percent or more, preferably about 90 percent or more of the impact resistance required for the reclaimed ABS resin.

Formula 1={Content of used ABS resin(A)}×{Impact resistance of used ABS resin(A)}+{Content of unused ABS resin(B)}×{Impact resistance of unused ABS resin(B)}+{Content of used ABS resin(C)}×{Impact resistance of used ABS resin (C)}

In the above formula, the impact resistance is measured in accordance with ASTM 256 under conditions for the 12.7 mm notched impact test.

The impact resistance required for the reclaimed ABS resin cannot be generally specified since it varies depending on the use of the reclaimed ABS resin, but, for example, there can be mentioned an impact resistance of the used ABS resin (A), as measured in a state in which the ABS resin (A) is unused.

More specifically, it is preferred that the value obtained from the formula 1 above is about 15 J/m or more.

The amount of the unused ABS resin (B) and/or another used ABS resin (C) added to the used ABS resin (A) may be determined as described above, but it is generally about 1 to 99% by weight, preferably about 1 to 80% by weight, further desirably about 1 to 50% by weight from the viewpoint of effective utilization of resources. From the viewpoint of obtaining a satisfactory effect of reviving the physical property of the used ABS resin (A) and effective utilization of resources and from an economical point of view, the above range is preferred.

With respect to the timing of addition of the above-mentioned unused ABS resin (B) and/or another used ABS resin (C) to the used ABS resin (A), there is no particular limitation, and the unused ABS resin (B) and/or another used ABS resin (C) may be added to and directly blended with the ground used ABS resin (A), or the unused ABS resin (B) and/or another used ABS resin (C) may be added to and blended with the used ABS resin (A) being kneaded or melted. When the unused ABS resin (B) and/or another used ABS resin (C) is added to the used ABS resin (A), for example, a compatibilizer may be further added. Further, an additive for resin conventionally known in the technical field of the present general inventive concept, for example, an antistatic agent, a coloring agent, a pigment, an antioxidant, a flame retardant, a plasticizer, a light resistance assistant, a compatibilizer, a surface treating agent, or a modifier, or reinforcement for resin, such as glass fiber, paper, or nonwoven fabric, may be added.

In the present general inventive concept, further, a pigment may be added to the used ABS resin (A). The used ABS resin (A) may change in color according to the use conditions, especially the color of the resin (A) may fade. In this case, by adding a pigment in the recycling operation, a reclaimed ABS resin equivalent to a virgin material with respect to the color can be obtained. Especially when the reclaimed resin is used in the original application, that is, the same application as the application in which the ABS resin before being recycled is used, the above advantage is effective. With respect to the pigment, there is no particular limitation, and a known pigment used in the technical field of the present general inventive concept may be used. Pigments are roughly classified into inorganic pigments and organic pigments, and, more specifically, examples include titanium oxide, cadmium compounds, carbon black, azo compounds, cyanine dyes, and polycyclic pigments.

In the present general inventive concept, an ABS resin which is almost transparent may be further added to the used ABS resin (A). The used ABS resin (A) may be colored with a desired color merely by adding a pigment as mentioned above, but merely the addition of a pigment may be difficult or cumbersome in the desired coloring. In this case, by further adding an almost transparent ABS resin to the used ABS resin (A) to fade the color of the used ABS resin (A), it is easy to color the used ABS resin (A) with a desired color. The almost transparent ABS resin can be easily produced by a known method, or one commercially available may be used. Specifically, examples of almost transparent ABS resins include resins having a light transmittance of 30% or more, preferably 50% or more. In the present general inventive concept, the almost transparent ABS resin is not further added and the unused ABS resin (B) and/or another used ABS resin (C) incorporated into the used ABS resin (A) may be an almost transparent ABS resin.

The above-described method for reprocessing a used ABS resin of the present general inventive concept can be applied even when the frequency of recycling of the used ABS resin (A) is 2 or more, and therefore, from the viewpoint of effective utilization of resources, reduction of waste, and the like, the method satisfactorily contributes to continuable development of society. Specifically, the present general inventive concept enables recycling of a used ABS resin represented by the following formula:

Use–(Collection–Reproduction–Reuse)$_n$–Landfill or Incineration wherein n is an integer of 1 or more, preferably an integer of about 1 to 7.

The reclaimed ABS resin obtained by the method for reprocessing a used ABS resin of the present general inventive concept has a physical property equivalent to or higher than that of a virgin material, and hence can be applied to various uses. Particularly, it is preferred that the reclaimed ABS resin of the present general inventive concept is used as a resin shaped article applied to, for example, electrical appliances, office appliances, vehicles, or miscellaneous goods. Especially, it is preferred that the reclaimed resin of the present general inventive concept is used as a housing for electrical appliance or a shell for magnetic recording product (e.g., videocassette for professional use, or 8 mm videocassette or DV cassette for consumer use).

EXAMPLES

Hereinbelow, the present general inventive concept will be described in more detail with reference to the following Examples, which should not be construed as limiting the scope of the present general inventive concept.

In the present Examples, the below-listed used ABS resins and ABS resins were used.

(a) Used ABS resin A1: used cassette shell which is one of the parts constituting a magnetic tape cassette for business purposes.

(b) Used ABS resin A2: waste from cassette for business purposes (resin salvaged from a broadcasting station).

The shell body (top and bottom) is comprised of an ABS resin (high-flow high-stiffness grade) and the window (transparent) portion of the shell is comprised of an AS resin (contained in an amount of 15% by weight, based on the total weight of the resins), and therefore the used ABS resin A2 includes a mixture of these resins.

(c) ABS resin: high-flow high-stiffness grade (virgin material of the above used ABS resin).
(d) ABS resin: general-purpose medium-impact grade.
(e) ABS resin: general-purpose high-impact grade.

Example 1

To the used ABS resin A1 of (a) above was added 50% by weight of the ABS resin of (d) above to prepare a reclaimed ABS resin of the present general inventive concept. As can be seen in Table 1, the ABS resin of (d) above is a resin having an impact resistance higher than that of the ABS resin (high-flow high-stiffness grade) contained in the used ABS resin A1.

Example 2

To the used ABS resin A1 of (a) above was added 25% by weight of the ABS resin of (e) above to prepare a reclaimed ABS resin of the present general inventive concept. As can be seen in Table 1, the ABS resin of (e) above is a resin having an impact resistance further higher than that of the ABS resin (high-flow high-stiffness grade) contained in the used ABS resin A1.

Example 3

A reclaimed ABS resin of the present general inventive concept was prepared in substantially the same manner as in Example 1 except that, instead of the used ABS resin A1 of (a) above, the used ABS resin A2 of (b) above was used.

Example 4

A reclaimed ABS resin of the present general inventive concept was prepared in substantially the same manner as in Example 2 except that, instead of the used ABS resin A1 of (a) above, the used ABS resin A2 of (b) above was used.

Test Examples

Using the ABS resins of (c) to (e) above as samples for evaluation, physical properties were measured with respect to the used ABS resin A1 of (a) above, the used ABS resin A2 of (b) above, and the reclaimed ABS resins prepared in Examples 1 to 4. The results are illustrated in the Tables below. The methods and conditions for the measurements of the physical properties are illustrated in the Tables below. The values of physical properties of the ABS resins of (c) to (e) above used in the Tables are those illustrated in the catalogues for the resins.

TABLE 1

| | | | | Grade | | | | |
| | | | | ABS resin | | | | |
| Test Items | Test method ASTM | Measurement conditions | (a) Used A1 | (c) High-flow high-stiffness grade | (d) General-purpose medium-impact grade | (e) General-purpose high-impact grade | Example 1 | Example 2 |
|---|---|---|---|---|---|---|---|---|
| Tensile yield strength (MPa) | 638 | 23° C., 50% RH | 50 | 51 | 54 | 49 | 50 | 54 |
| Tensile elongation at breakage (%) | | | 19 | 20 | 37 | 48 | 19 | 37 |
| Flexural strength (MPa) | 790 | 23° C., 50% RH | 79 | 77 | 81 | 74 | 75 | 84 |
| Flexural modulus (MPa) | | | 2600 | 2550 | 2600 | 2300 | 2550 | 2450 |
| Izod impact strength (J/m) | 256 | 12.7 mm notched | 60 | 108 | 137 | 177 | 96 | 128 |
| Melt flow rate (g/10 min) | ISO-1133 | 220° C., 98 N | 53 | 48 | 20 | 15 | 46 | 16 |
| Deflection temperature under load (° C.) | 648 | 6.4 mm, 1.82 MPa load | 87 | 87 | 88 | 87 | 87 | 87 |

TABLE 2

| | | | | Grade | | | | |
| | | | | ABS resin | | | | |
| Test items | Test method ASTM | Measurement conditions | (b) Used A2 | (c) High-flow high-stiffness grade | (d) General-purpose medium-impact grade | (e) General-purpose high-impact grade | Example 3 | Example 4 |
|---|---|---|---|---|---|---|---|---|
| Tensile yield strength (MPa) | 638 | 23° C., 50% RH | 55 | 51 | 54 | 49 | 54 | 55 |
| Tensile elongation at breakage (%) | | | 16 | 20 | 37 | 48 | 17 | 36 |

TABLE 2-continued

| | | | Grade | | | | | |
|---|---|---|---|---|---|---|---|---|
| | | | | ABS resin | | | | |
| | Test method | Measurement | (b) | (c) High-flow high-stiffness | (d) General-purpose medium-impact | (e) General-purpose high-impact | Example | |
| Test items | ASTM | conditions | Used A2 | grade | grade | grade | 3 | 4 |
| Flexural strength (MPa) | 790 | 23° C., 50% RH | 81 | 77 | 81 | 74 | 81 | 85 |
| Flexural modulus (MPa) | | | 2800 | 2550 | 2600 | 2300 | 2600 | 2500 |
| Izod impact strength (J/m) | 256 | 12.7 mm notched | 51 | 108 | 137 | 177 | 88 | 116 |
| Melt flow rate (g/10 min) | ISO-1133 | 220° C., 98 N | 52 | 48 | 20 | 15 | 45 | 17 |
| Deflection temperature under load (° C.) | 648 | 6.4 mm, 1.82 MPa load | 88 | 87 | 88 | 87 | 87 | 87 |

From the results illustrated in Table 1, by blending with the used ABS resin containing an ABS resin of a high-flow high-stiffness grade 50% by weight of an ABS resin (general-purpose medium-impact grade) having an impact resistance higher than that of the ABS resin of the above high-flow high-stiffness grade, the impact strength was improved to be about 90 percent of the impact strength of the ABS resin of the original grade (high-flow high-stiffness grade). By blending with the used ABS resin 25% by weight of ABS of a high-impact grade, the impact strength was improved to be higher than the impact strength of the original grade (high-flow high-stiffness grade), and improved to be about 90 percent of the impact strength of the medium-impact grade ABS resin illustrated in Table 1, indicating that reprocessing of the used ABS resin into an ABS resin of a higher grade is possible.

Further, from Table 2, with respect to the reclaimed ABS resin containing an AS resin, recovery of the impact strength is smaller by about 1 percent than that of the ABS resin alone, but the impact strength of the reclaimed ABS resin obtained in Example 4 is equivalent to or higher than that of the ABS resin of the original grade (high-flow high-stiffness grade), indicating that the method of the present general inventive concept is effective.

Further, using an ABS resin which is colorless and almost transparent as a resin blended with the used ABS resin, the color was adjusted upon blending, and molding of a cassette shell for business purposes was performed. As a method for color evaluation, comparison with a criteria sample or a measurement of a spectrum level by means of a differential calorimeter was made. As a result, a cassette shell with no problem of color was obtained.

Example 5

To the used ABS resin of (a) above was added 90% by weight of the ABS resin of (b) above to prepare a reclaimed resin.

Physical properties of the reclaimed ABS resin obtained were measured, and, as a result, it was found that, for reviving the used ABS resin so as to regain properties of an ABS resin of the original grade (high-flow high-stiffness grade), it was necessary to add 90% by weight of a virgin material.

As mentioned above, in the recycling system proposed in the present general inventive concept, the conventional classification of used plastic materials by the types of the plastic materials is changed to separation by the function or purpose for needs of recycled products, and the material is subjected to reviving means needed, enabling quality assurance for the recycled resin. The use and application of the reclaimed plastic assured of quality by the present general inventive concept are expanded, differing from the conventional reclaimed plastic which is inevitably lowered in the property and used only in part of recycled products. Particularly, by the present general inventive concept, there can be obtained effects that cannot be obtained by the existing recycling systems, e.g., use of the reclaimed rein in the same product as the rein before being recycled, and development of the reclaimed rein having added value to a higher grade.

Specifically, the recycling system of the present general inventive concept can be used as a system for recycling plastics for use in the application of magnetic recording products. Especially, the present general inventive concept is most advantageous in collection, separation, and revival of HIPS and ABS resins.

Further, by the present system, various effects of protection of the environment, e.g., effective utilization of plastics, energy saving, reduction of the amount of carbon dioxide exhausted, and the like can be obtained.

On the other hand, by the present general inventive concept, a used ABS resin, which has been discarded as waste since the physical property is lowered during the reprocessing, can be improved in the physical property. That is, the present general inventive concept provides an effective technique for reprocessing a used ABS resin, and therefore can achieve effective utilization of resources and reduction of waste and contribute to protection of the environment.

What is claimed is:

1. A plastic material containing a reclaimed plastic obtained by a system for recycling a used plastic material as a resin material, wherein said recycling system comprises:
   a sorter which sorts said used plastic materials by purpose of recycling;
   a device which crushes and melts said used plastic material that has been sorted;
   a reviver which regains a desired property in said used plastic material to yield a reclaimed plastic;
   a measurer which measures a physical property of a sample sorted for evaluation from said reclaimed plastic to yield a measure physical property value; and an indicator which indicates said measured property value on said reclaimed plastic to provide recycle history information on said reclaimed plastic.

2. An acrylonitrile-butadiene-styrene resin obtained by a system for recycling a used plastic material as a resin material, wherein said recycling system comprises:
- a sorter which sorts said used plastic material by purpose of recycling;
- a device which crushes and melts said used plastic material that has been sorted;
- a reviver which regains a desired property in said used plastic material to yield a reclaimed plastic;
- a measurer which measures a physical property of a sample sorted for evaluation from said reclaimed plastic to yield a measured physical property value; and
- an indicator which indicates said measured physical property value on said reclaimed plastic to provide recycle history information on said reclaimed plastic.

3. A polycarbonate resin containing a polycarbonate resin obtained by a system for recycling a used plastic material as a resin material, wherein said recycling system comprises:
- a sorter which sorts said used plastic material by purpose of recycling;
- a device which crushes and melts said used plastic material that has been sorted;
- a reviver which regains a desired property in said used plastic material to yield a reclaimed plastic;
- a measurer which measures a physical property of a sample sorted for evaluation from said reclaimed plastic to yield a measured physical property value; and
- an indicator which indicates said measured physical property value on said reclaimed plastic to provide recycle history information on said reclaimed plastic.

4. A resin shaped article containing an acrylonitrile-butadiene-styrene resin comprising an acrylonitrile-butadiene-styrene resin obtained by a system for recycling a used plastic material as a resin material, wherein said recycling system comprises:
- a sorter which sorts said used plastic material by purpose of recycling;
- a device which crushes and melts said used plastic material that has been sorted;
- a reviver which regains a desired property in said used plastic material to yield a reclaimed plastic;
- a measurer which measures a physical property of a sample sorted for evaluation from said reclaimed plastic to yield a measured physical property value; and
- an indicator which indicates said measured physical property value on said reclaimed plastic to provide recycle history information on said reclaimed plastic.

5. A resin shaped article containing a polycarbonate resin comprising a polycarbonate resin obtained by a system for recycling a used plastic material as a resin material, wherein said recycling system comprises:
- a sorter which sorts said used plastic material by purpose of recycling;
- a device which crushes and melts said used plastic material that has been sorted;
- a reviver which regains a desired property in said used plastic material to yield a reclaimed plastic;
- a measurer which measures a physical property of a sample sorted for evaluation from said reclaimed plastic to yield a measured physical property value; and
- an indicator which indicates said measured physical property value on said reclaimed plastic to provide recycle history information on said reclaimed plastic.

6. The resin shaped article according to claim 4 or 5, wherein said article is a magnetic recording product.

7. A method for reprocessing a used acrylonitrile-butadiene-styrene resin, said method comprising:
- separating from a used product the used acrylonitrile-butadiene-styrene resin in an independent form or in a form of a mixture with another resin to yield a separated acrylonitrile-butadiene-styrene resin,
- incorporating into said separated acrylonitrile-butadiene-styrene resin an unused acrylonitrile-butadiene-styrene resin and/or another used acrylonitrile-butadiene-styrene resin to improve a physical property of said separated acrylonitrile-butadiene-styrene resin to yield a reclaimed plastic;
- appending recycle history information including the physical property to said reclaimed plastic.

8. The reprocessing method according to claim 7, wherein the mixture of the used acrylonitrile-butadiene-styrene resin and the another resin includes an acrylonitrile-styrene resin from said used product.

* * * * *